July 4, 1944.   A. H. J. DE L. SAINT GENIES   2,352,864
DEVICE FOR MAKING EXPOSURES ON LENTICULAR FILMS
Filed Feb. 10, 1940

Inventor:
ANNE HENRI JACQUES DE LASSUS SAINT GENIES
By Stone, Boyden & Mack
Attys.

Patented July 4, 1944

2,352,864

UNITED STATES PATENT OFFICE 2,352,864

DEVICE FOR MAKING EXPOSURES ON LENTICULAR FILMS

Anne Henri Jacques de Lassus Saint Genies, Versailles, France; vested in the Alien Property Custodian Application February 10, 1940, Serial No. 318,344
In France January 27, 1939

5 Claims. (Cl. 95—2)

The present invention relates to combined optical blending and dispersing devices for effecting exposures on lenticular films as used for example in three colour photography.

The distinct image points corresponding to the juxtaposed bands of the colour filter in colour cinematography on lenticular film result in the recording on the film of monochrome images which are not strictly coincident except at the parts representing the plane of the photographed object which is exactly in focus.

The lack of coincidence, is much more pronounced the further the object is removed from the plane of sharp definition. It shows itself, on projection of films, in the production of coloured fringes, and these latter are the more pronounced the greater the aperture and the greater the focal length of the camera lens used for making the exposures.

To overcome this drawback inherent in making exposures in colour on lenticular films, various means have already been proposed utilizing mirrors or prisms, either to give to two of the colour bands of the filter, or to three of them, the breadth of one of these bands as image point base, or by blending each of the image points partially with the other two.

In the first case, there is achieved the dispersion of the relatively narrow beam of light striking the entry lens, and its distribution over the entire breadth of the filter, but this result is obtained at the cost of a considerable reduction in the light yield of the lens.

In the second case, the beams striking the lens are blended over the breadth of the filter, but owing to the reflecting surfaces used being strictly parallel, it will be understood that focussing can only be effected for the plane of infinity of the object photographed, and it is consequently necessary to add to the device, in front of the lens, a large aperture system of variable focal length which enables any other plane of the object to be sharply focussed by throwing such plane back to infinity by collimation.

Apart from the very considerable complication implied in the use of a collimating system for this purpose, which has to have a wide aperture and be perfectly corrected, it will be understood that the light yield of the assembly is also seriously affected by the number of glasses of which this collimating system is composed.

The present invention has for its object to provide a combined dispersing and blending device for the beams of light, of high luminous efficiency and capable of allowing the camera to be sharply focussed on any plane of the object photographed.

It is proposed in particular to provide certain forms of construction especially adapted to the cases 1. The case in which focussing adjustment has to take place by the usual variation of the extent to which the objective is moved away from the recording surface, while at the same time, in accordance with the invention, this result is brought about by deformation of the device for blending and dividing up the beams without the attachment, in front of the objective, of any system for collimating the plane to which the camera is focussed.

2. The case in which it is desired to provide a diaphragm in the plane of the entry face of the blending and dispersing device.

3. The case in which the three colour filter is of circular shape or alternatively of the known shape of a curvilinear lozenge, in order to obtain the best light yield from the objective.

The invention which employs the known expedient of totally or partially reflecting surfaces forming an angle of 90° between them presents the following novel characteristics:

(1) The division of each of the three coloured bands of the filter into two segments of equal width, which determines six segments having in all the same superficial area as the pupil of entry of the camera lens;

(2) The provision of totally or partially reflecting facets projecting normally to the plane of the filter in such a manner that each coloured band may be completely covered by the projection of merely two facets which baffle each other either between two superposed tiers or in the same and single tier;

(3) Such distribution of the beams passing through each segment that they emerge either through two, or at the most through three of the six segments of the pupil of entry of the camera lens;

(4) Paths of beams, which, by virtue of this division and the baffle arrangement, are as short and symmetrical as possible, while the device itself is as small as possible in depth, so that, with a minimum of reflections as set forth above under (3), maximum light yield is secured;

(5) Avoiding the provision in front of the device, of a system for collimating the focussing plane (a system which is generally inseparable from light beam blending devices equipped with totally or partially reflecting facets), and consequently enabling the handling of the device to be simplified while at the same time achieving the novel improvement in light yield by subdividing the dispersing and blending device into a plurality of relatively articulated bodies.

Preferred embodiments of the invention are shown, by way of example only, in the accompanying drawing, in which.

Figure 1:
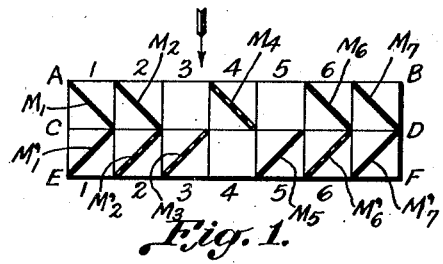
Fig. 1 shows, in diagrammatic section, an embodiment of the combined blending and dispersing device according to the invention.

In Fig. 1, there is represented in section a blending-dispersing device in accordance with the invention, in which the distribution of the beams is in a high degree symmetrical. The totally reflecting facing elements are shown in full lines and the partially reflecting in broken or dotted lines. For example, the facing elements M$_3$ and M$_4$ may be 66% reflecting and the facing elements M'$_2$ and M'$_6$ merely 50% reflecting. It will be seen that in this case the flux falling on the segment I of the face AB of the device, at incidence, emerges in equal parts through the segments 1 and 2 of the face EF on emergence; and that, in a symmetrical manner, the flux incident on AB at 6 emerges at face EF through 6 and 5.

It will also be seen that the flux incident on M$_2$ is divided up between the segments 4, 5 and 6 on emergence, and that, in a symmetrical manner, that incident on M$_5$ is divided up between the segments 3, 2 and 1. Finally, it will be seen that the flux incident on M$_3$ is divided, at emergence, between the segments 1, 2, 3, just as that incident on M$_4$ is divided between the segments 6, 5, 4. It will also be observed that a highly symmetrical distribution is obtained by masking out the semi-reflecting facing elements M'$_2$ and M'$_6$.

In this symmetrical distribution of the beams, given by way of example, the differences of path are slight and negligible, owing to the small total thickness of the two superposed stages (amounting to half that obtained without the baffling arrangement of the facing elements and without dividing the surface of incidence into six segments), and also owing to the principle according to which a beam divided at incidence does not traverse all the segments of the face at which it emerges but only, two, or at the most three of these six segments.

It should be noted that the faces of incidence and emergence of the device shown in Fig. 1 may be interchanged without any alteration in the principle of operation of the device.

Figure 2:
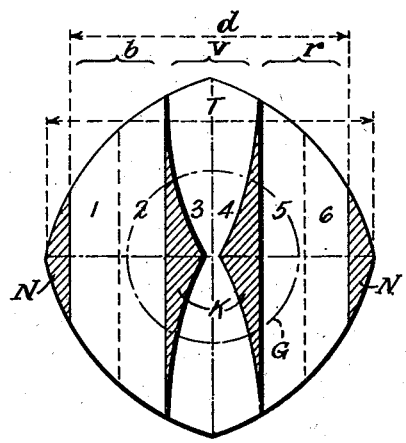
Fig. 2 shows the entry pupil of the camera lens.

In Fig. 2 is indicated in outline a filter having the contour of a curvilinear lozenge, known for giving the diaphragm corresponding to the maximum useful aperture of a camera lens. In order to ensure the most correct use possible of the pupil of entry furnished by this diaphragm, in combination with the combined blending and dispersing device according to the invention, the diameter of this diaphragm, measured perpendicularly to the direction of the coloured bands, is reduced to a value $d$ which is less by about ⅛ than the diameter T, by eliminating the corners N.

In this way, and at the cost of an insignificant sacrifice of luminosity of this diaphragm, the disparities between the mean values of the respective heights of the segments 1, 2, and 3 (and correspondingly of 4, 5 and 6) is diminished, while at the same time a substantial improvement is effected in the efficiency of this filter when used with a combined blending and dispersing device according to the invention, of the type shown by way of example in Fig. 1.

It will readily be understood, for example, that the fluxes incident on the segments 3 and 4 of the face AB would be reduced to a considerable extent, with reference to the fraction emerging therefrom through the segments 1 and 6, if this precaution were not taken.

It is assumed that the lozenge shape with truncated corners delimits, without varying, the emergent face EF of the device, whereas there may be utilized a circular diaphragm of variable diameter, an iris diaphragm for example, in the plane of the incident face AB, centered on the axis of the camera lens. For this purpose it is necessary that the ratio between the flux emerging through the central band, on the one hand, and that emerging through one of the side bands of the lozenge-shaped filter, on the other hand, remain substantially constant when the diameter of the diaphragm varies.

It is known that when a three colour filter comprises three bands of the same breadth occupying the pupil of entry of maximum useful aperture, it is necessary to obscure the central coloured band of this filter relatively to the neighbouring bands, on account of its greater height.

This greater degree of opacity could not however in practice be imparted to it in the present device without effecting variation of the ratio between the fluxes discussed above when the diameter of an iris diaphragm placed in the plane of incidence AB of the device is caused to vary.

Calculation shows indeed that the ratio between the flux emerging from the central band of the filter and that emerging from one of the side bands varies with the aperture of the iris diaphragm disposed in front of the blending and dispersing device, in the vicinity of its surface of incidence AB, in a different manner according to the degree of reflection taken for the partially reflecting facets of the device. There are consequently represented in this Fig. 2 what might quite simply be masks K associated with the central band, providing the screening effect referred to above, as desirable, in the event for example of the facets M$_3$ and M$_4$ being semi-reflecting and the facets M'$_2$ and M'$_6$ dispensed with, in order that, when the filter is of the kind which is balanced at full aperture, this equilibrium is automatically maintained whatever be the diameter of the diaphragm G susceptible of variation between full aperture and $d/n$, $n$ being any number which may possibly be greater or smaller than the number 3.

Figure 3:
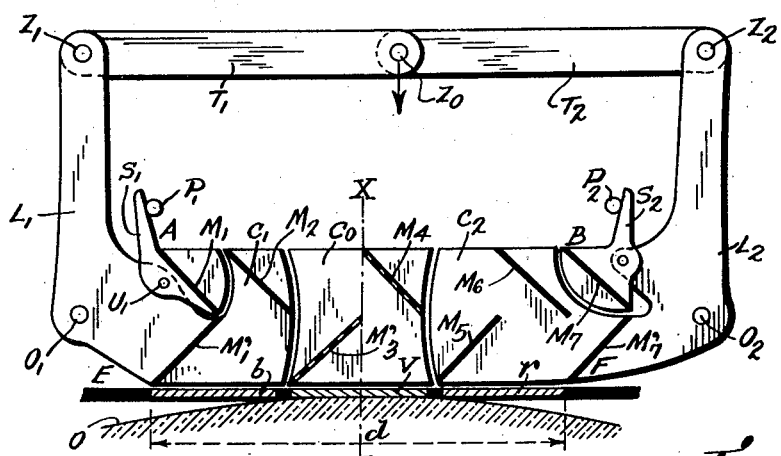
Fig. 3 shows an arrangement constituting a deformable dispersing and blending device.

In Fig. 3 the body C$_0$ of the central facing elements M$_3$ and M$_4$ is fixed and assumed to be integral with the filter $b$, $v$, $r$ and with the objective the central portion of which is indicated at O. It will be understood that symmetrical rotational movements of the two lateral bodies C$_1$ and C$_2$ pivoted at O$_1$ and O$_2$, provided these rotational movements equal the same appropriate fraction of the parallax of an object point in the focussing plane, will produce, between the beams of the reflected flux and the beams pertaining to the "direct flux," the desired deviations for the purpose of ensuring that these various fluxes combine exactly to form the same image of the said point. In this figure there is no longer any "direct flux" except for that which passes without reflection through the central fixed body $C_0$. The beams incident on the faces $M_1$ and $M_6$ are the only ones which undergo an even number of reflections in one and the same body. But it will be seen, with reference to Fig. 3, that, since the faces $M'_2$ and $M'_6$ of the arrangement shown in Fig. 1 are omitted, the beams incident on the segments 1 and 6 of the plane AB emerge at $d/6$ from their respective points of incidence through the segments 2 and 5 of the plane EF. In order to ensure, on emergence from the device, the propagation of these beams which coact with the beams of the "direct flux" in the formation of the same image of the object focussing plane, it is necessary that one of the faces at which these beams are reflected an even number of times in a lateral body of the device, be turned in the appropriate sense, relatively to the other neighbouring face or faces, through an angle which is half that required for facing elements spaced apart by $d/3$ and pertaining to two adjacent pivoted bodies. This rotation is permitted, in the case of the embodiment shown in Fig. 3 for example, by supplementarily pivoting the facets $M_1$ and $M_7$, at $U_1$ and $U_2$, on the levers $L_1$ and $L_2$, respectively, pertaining to the mounting for the two articulated side bodies $C_1$ and $C_2$. This rotary adjustment is controlled, when these levers are moved by extension of the lens O in the course of focussing, with consequent adjustment of the lens relatively to the fixed point of articulation on the camera, for example by the abutment of fingers such as $S_1$ and $S_2$ against blocks $P_1$ and $P_2$ secured for example to the lens mounting; these fingers, which are secured to the articulated mountings of the facets $M_1$ and $M_7$, are of suitable profile.

It will be understood that if the facets $M'_2$ and $M'_6$ are held in position on the device shown in Fig. 3, in the manner indicated in Fig. 1, it would also be necessary to make these facets articulated like the facets $M_1$ and $M_7$ on the mountings $L_1$ and $L_2$ of the side bodies $C_1$ and $C_2$. It is in fact necessary, on the one hand, that the fractions of each of the beams incident on the segments 1 and 6 of the surface AB, which are also reflected by each of the facets $M'_2$ and $M'_6$, shall not undergo any deflection on emergence from the device, because these fractions, emerging through segments of the face EF denoted by the same indices 1 and 6 as those of the entry face, are comprised in the "direct flux." On the other hand, it is also necessary, and at the same time, that the fractions of beams striking these facets $M'_2$ and $M'_6$ and coming by reflection on the facets $M_3$ and $M_4$, and which emerge through the segments 2 and 5 of the face EF, be deflected through the angle corresponding to the deviation $d/6$ which exists only between the points of incidence and emergence of the rays of these fractions of beams. Finally, this articulation of the facets $M'_2$ and $M'_6$ has no effect upon the fractions of these same beams which traverse them and emerge through the segments 1 and 6 of the face EF, nor on those which emerge through the segments 2 and 5 of the face EF and derived from beams incident on the segments 1 and 6 of the face AB. Thus, these various fractions only undergo, respectively, as has been seen above to be necessary, deviations imposed by rotation of the facets $M_1$ and $M_7$ regulated on the one hand for the spreading to the extent of $d/6$ extant between the points of incidence and emergence of the first of these fractions of beams, and by rotation of the bodies $C_1$ and $C_2$ regulated on the other hand for the spreading to the extent of $d/3$ established between the points of incidence and emergence of the second of these fractions of beams.

It will also be understood, as explained in connection with Fig. 1, that, mutatis mutandis, the face of incidence and emergence AB and EF respectively of the device shown in the Fig. 3 may be interchanged without in any way altering the desired result.

It is self-evident that, as stated in the parent patent, the cylindrical separation surfaces of the prismatic elements presenting totally or partially reflecting faces, are bathed by a relatively non-volatile liquid having a coefficient of refraction closely approximating to that of the substance of which the device is composed, or alternatively, that according to the mode of construction indicated by Brewster in his U. S. Patent No. 1,277,040, 1918, and for the purpose of substituting metallized mirrors which are totally or partially reflecting, for the prismatic elements of a beam dividing or dispersing device, the separation surfaces of articulated bodies may also be immersed together with the whole of the device, in a tank containing liquid of such composition that its refractive index renders absolutely invisible the glass of the mirrors of which only the metallized surface reflects. For this purpose it is known to employ aqueous solutions of iodo-mercuriate of barium, potassium, or sodium, the refractive index of which may attain the figure 1.7.

Figure 4:
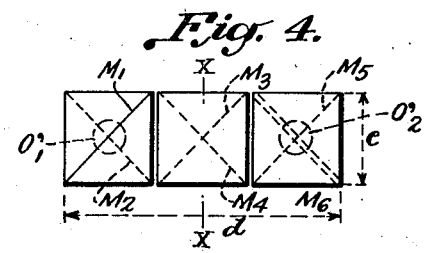
Figs. 4 and 5 show a simplified modification of the device illustrated in Fig. 3.
Figure 5:
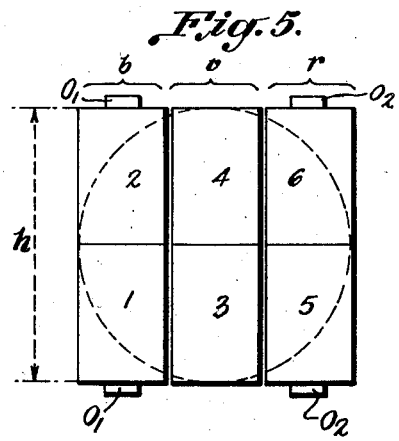

Figs. 4 and 5 represent, in section and in plan view respectively, a device in which the six segments of the diaphragm (assumed to be circular) delimiting the filter, are divided into two groups of three separated by a diameter lying transversally of the bands $b$, $v$, $r$ of this three colour filter, and in which the odd and even facets cross each other at 90°. These facets occupy for example the entire thickness $e$ of the device, which is equal to the thickness of the two superposed tiers of the preceding devices, and, for example, the facets $M_2$ and $M_5$ are 66% reflecting, the facets $M_3$ and $M_4$ 50% reflecting, and the facets $M_1$ and $M_6$ 100% reflecting. All are symmetrical again in respect of the paths of rays in the two groups of facets, but a substantial fraction of the incident beams is lost by the totally reflecting facets.

The efficiency of the device and the distribution of the beams between the central and side segments may be very considerably improved by making them all of the same maximum height $H/2$, which increases the parts reflected by the side facets and destined to traverse the segments covered over by the other facets.

In these latter combinations, it is sufficient for the facets to be divided up between three bodies $C_0$, $C_1$, $C_2$, in order to ensure, by articulation about the axes $O_1$ $O'_1$, $O_2$ $O'_2$, correct focussing simultaneously with extension of the lens. It is also sufficient for the dividing surfaces between the three bodies to be plane, with very slight spacing in the case of lenses in which $d$ is relatively small, since the rotation of the two side bodies is also very limited.

It is self-evident that there may be usefully combined with a modification of this kind, the improvement indicated in Fig. 2 which consists, for the purpose of masking out the central band of the filter and of ensuring constant ratio of the coloured fluxes on emergence, in disposing masks such as K of appropriate pre-determined shape, on the central coloured band.

The invention also extends, and notably so, to all combinations of the aforesaid embodiments, in which there will invariably be observed in part or in their totality the characteristics of the invention.

I claim:

1. In a photographic system for making exposures in three colours on lenticular films, apparatus comprising an optical device having a set of entrance zones and a set of exit zones for light, the number of each set of zones being six, an objective, a three-colour filter between said optical device and said objective, said optical device including means for blending and dispersing beams of light rays mounted in front of said objective and comprising plane facets disposed in a single tier having two portions each affected to the extent of one half by the colour filter, according to a diametrical division at right angles to the lines of separation between its coloured zones, the inclination of the facets in one of the two portions of the blending and dispersing means being different from the inclination of the facets in the other of the said portions, the opposite faces of each facet being parallel and said facets being disposed in such a manner that each of the beams reflected once by one of said facets and reflected a second time by others of the said facets, traverses at least one sixth and at the most one half of the whole of the coloured zones of the said filter, said reflecting facets being parallel in each of said portions and at right angles as between portions.

2. In a photographic system for making exposures in three colours on lenticular films, apparatus comprising an optical device having a set of entrance zones and a set of exit zones for light, the number of each set of zones being six, an objective, a three-colour filter between said optical device and said objective, said optical device including means for blending and dispersing beams of light rays mounted in front of said objective and comprising plane facets disposed in a single tier having two portions each affected to the extent of one half by the colour filter, according to a diametrical division at right angles to the lines of separation between its coloured zones, the inclination of the facets in one of the two portions of the blending and dispersing means being different from the inclination of the facets in the other of the said portions, the opposite faces of each facet being parallel and said facets being disposed in such a manner that each of the beams reflected once by one of said facets and reflected a second time by others of the said facets, traverses at least one sixth and at the most one half of the whole of the coloured zones of the said filter, the said blending and dispersing means comprising a central body fixed relatively to the objective and covering the central band of the said three-colour filter, while the side bodies covering the side bands of the filter are articulated about axes pertaining to the objective and are actuated by movement of the objective in focussing the camera on the object to be photographed, said reflecting facets being parallel in each of said portions and at right angles as between portions.

3. In a photographic system for making exposures in three colours on lenticular films, apparatus comprising an optical device having a set of entrance zones and a set of exit zones for light, the number of each set of zones being six, an objective, a three-colour filter between said optical device and said objective, said optical device including means for blending and dispersing beams of light rays mounted in front of said objective and comprising plane facets disposed in two superposed tiers and at right angles as between tiers, having the same inclination in each tier, those of one tier being arranged to baffle those of the other tier in such a manner that each of the said facets only covers half of one coloured zone of the said filter, the said blending and dispersing device comprising a central body fixed relatively to the objective and covering the central band of the said three colour filter, while the side bodies covering the side bands of the filter are articulated about axes pertaining to the objective and are actuated by displacement of the objective in the course of its movement for bringing the object to be photographed into focus, facets of each of the said side bodies being separately articulated on the said bodies and adapted to carry out rotational movements different from the movements of said bodies in the course of the focussing operation, some of said facets being totally reflecting and others being partially reflecting and partially transmitting, said facets being disposed in such a manner that each of the beams reflected once by one of said facets and reflected a second time by others of the said facets, traverses at least one sixth and at the most one half of the whole of the coloured zones of the said filter.

4. In a photographic system for making exposures in three colours on lenticular films, apparatus comprising an optical device having a set of entrance zones and a set of exit zones for light, the number of each set of zones being six, an objective, a three-colour filter between said optical device and said objective, said optical device including means for blending and dispersing beams of light rays mounted in front of said objective and comprising plane reflecting facets arranged in two rows of opposite inclination, the opposite faces of each facet being parallel, the adjacent faces of all of said facets being reflecting and some of them being completely reflecting and others being partially reflecting and partially transmitting, said facets being disposed in such a manner that each of them only covers half a coloured zone of the said filter and that each of the beams reflected once by one of said facets and reflected a second time by others of the said facets, traverses at least one sixth and at the most one half of the whole of the coloured zones of the said filter, said blending and dispersing means being associated with a variable aperture iris diaphragm and with masks so associated with said filter as to mask the central band thereof and of such shape that variations in the aperture of said diaphragm do not modify appreciably the balance of the colours, said reflecting facets being parallel in each row and at right angles as between rows.

5. A light blending device for use in a photographic system for making exposures on lenticular films, said device comprising a transparent body having a set of six light entrance zones provided with an entrance face and a set of six light exit zones provided with an exit face which is parallel to said entrance face, facets provided in said body in two rows, one row of facets being adjacent the entrance face and the second row of facets being adjacent the exit face, the facets in the two rows being oppositely inclined relative to each other, the faces of the facets in one row being parallel as respect to each other and at right angles as respect to the facets in the opposite row, the adjacent faces of all of said facets being reflecting and some of the adjacent faces being completely reflecting while others are partially reflecting and partially transmitting, each facet being positioned to extend across a separate zone, the facets adjacent said entrance face being located across the first, second, fourth and sixth zones counting from one end of the device and the facets adjacent said exit face being located across the first, second, third, fifth and sixth zones from said first named end of the device, the body of said device being provided with an extension portion at the end thereof opposite said first named end, and a pair of facets provided in said extension portion, one of said pair of facets being parallel to the facets in one of said rows of facets and the other of said pair of facets being parallel to the facets in the other of said rows.

ANNE HENRI JACQUES DE
    LASSUS ST. GENIES.